(12) United States Patent
Henderson

(10) Patent No.: US 12,507,354 B1
(45) Date of Patent: Dec. 23, 2025

(54) MOUNTING MECHANISM FOR NETWORKING DEVICE

(71) Applicant: FRONTIER COMMUNICATIONS HOLDINGS, LLC, Dallas, TX (US)

(72) Inventor: Franklin C. Henderson, May, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 19/175,647

(22) Filed: Apr. 10, 2025

(51) Int. Cl.
*H05K 5/02* (2006.01)
*F16M 13/02* (2006.01)

(52) U.S. Cl.
CPC .......... *H05K 5/0204* (2013.01); *F16M 13/02* (2013.01)

(58) Field of Classification Search
None
See application file for complete search history.

(56) References Cited

U.S. PATENT DOCUMENTS

| | | | | |
|---|---|---|---|---|
| 6,009,223 | A * | 12/1999 | Arizpe | G02B 6/4454 385/136 |
| 7,439,443 | B2 * | 10/2008 | Dinh | H02G 3/126 220/3.9 |
| 8,702,047 | B2 * | 4/2014 | Nuernberger | H02G 3/08 248/200.1 |
| 12,114,456 | B2 * | 10/2024 | Oh | H02G 3/126 |
| 12,166,336 | B2 * | 12/2024 | Korcz | H02G 15/00 |
| 12,235,503 | B2 * | 2/2025 | Geens | G02B 6/4441 |
| 12,244,130 | B2 * | 3/2025 | Oh | H02G 3/081 |
| 2006/0198593 | A1 * | 9/2006 | Ivancevic | G02B 6/48 385/135 |
| 2009/0152416 | A1 * | 6/2009 | Kim | H05K 5/0204 248/205.1 |
| 2011/0001026 | A1 * | 1/2011 | Kubsad | A47B 96/067 248/223.41 |
| 2013/0094127 | A1 * | 4/2013 | Lu | F16M 11/06 361/679.01 |
| 2019/0376643 | A1 * | 12/2019 | Witherbee | H02G 3/10 |
| 2022/0010923 | A1 * | 1/2022 | Wilcox | G02B 6/3624 |

* cited by examiner

*Primary Examiner* — Xanthia C Relford
(74) *Attorney, Agent, or Firm* — MARSHALL, GERSTEIN & BORUN LLP

(57) ABSTRACT

A retention bracket for retaining an optical network component is provided that includes a body defining at least one structure mounting member that secures the body with a portion of a structure, and a retention protrusion operably coupled with the body. The retention protrusion releasably engages with an optical networking component to secure the optical networking component to the portion of the structure.

9 Claims, 7 Drawing Sheets

MOUNTING MECHANISM FOR NETWORKING DEVICE

FIELD OF THE DISCLOSURE

This disclosure relates generally to networking systems, and, more particularly, to mounting mechanisms for networking systems.

BACKGROUND

A conventional passive optical network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. In some examples, an LMTU may be in the form of an optical network terminal (ONT) or an optical network unit (ONU) that is optically connected to the OLT via a respective distribution optical fiber received at the LMTU. Such ONTs are typically disposed within enclosures and/or may be affixed to a structure, a pole, and/or other suitable stationary objects.

Because of continued advancements to PON technologies, improved and/or higher-powered ONTs have been developed which may be of different dimensions than existing units. Such ONTs may require revisions to retention mechanisms (e.g., brackets, straps, etc.) in order to securely retain the device. In some arrangements, these mechanisms may require on-site modifications and/or alterations, and may be difficult to mount onto a desired structure.

Accordingly, there is a need for improved devices having improved functionalities.

SUMMARY

In accordance with a first aspect, a retention bracket adapted to retain an optical networking component includes: (1) a body and defining at least one structure mounting member adapted to secure the retention bracket with a portion of a structure; and (2) a retention protrusion operably coupled with the body. The retention protrusion is adapted to releasably engage with an optical networking component to secure the optical networking component to the portion of the structure.

In some examples, the retention bracket may further include the retention protrusion having a lobe extending from an arm, wherein the arm is positioned at or near an upper end of the body.

In these and other forms, the lobe of the retention bracket may include a generally planar upper surface coupled with a semi-circular lower surface. Further, the retention bracket may have the generally planar upper surface of the lobe coplanar to the upper end of the body.

In some approaches, the retention bracket may also have the arm including a support buttress. Additionally, the support buttress may include a ramp surface adapted to direct the optical networking component during decoupling and coupling.

Moreover, the retention bracket can further include a plurality of retention protrusions. In another configuration, the at least one structure mounting member of the retention bracket may include a throughbore adapted to receive a fastener.

In accordance with a second aspect, an optical networking system comprises: (1) an optical networking component having a housing, the housing including at least one coupling feature; and (2) a retention bracket including: (a) a body and defining at least one structure mounting member adapted to secure the body with a portion of a structure; and (b) at least one retention protrusion operably coupled with the body. The at least one coupling feature of the optical networking component is adapted to releasably engage with the retention protrusion to secure the optical networking component to the portion of the structure.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
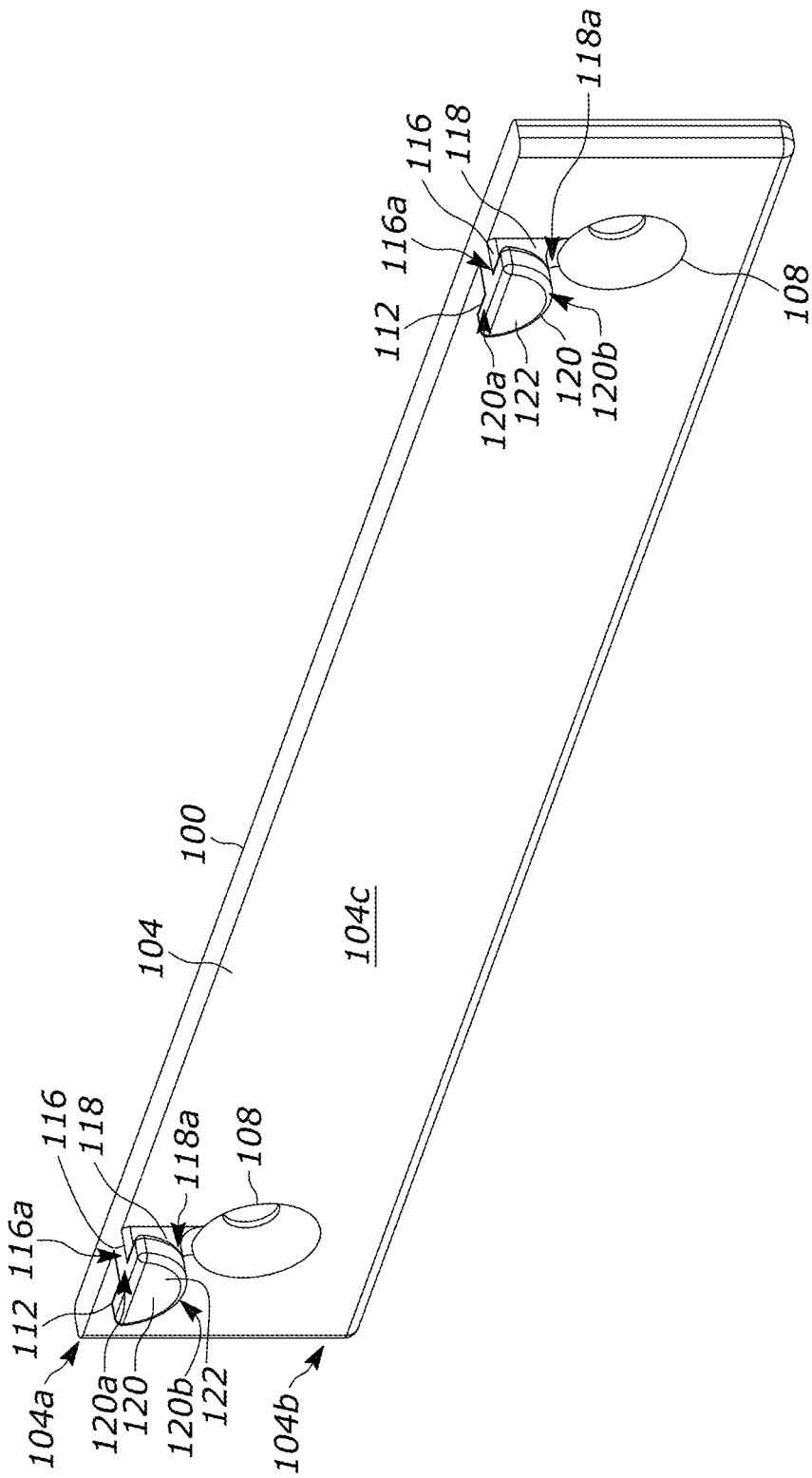
FIG. 1 is a perspective view of an example retention bracket for retaining at least one networking component in which the systems, methods, and/or techniques of the present disclosure may be implemented.
Figure 2:
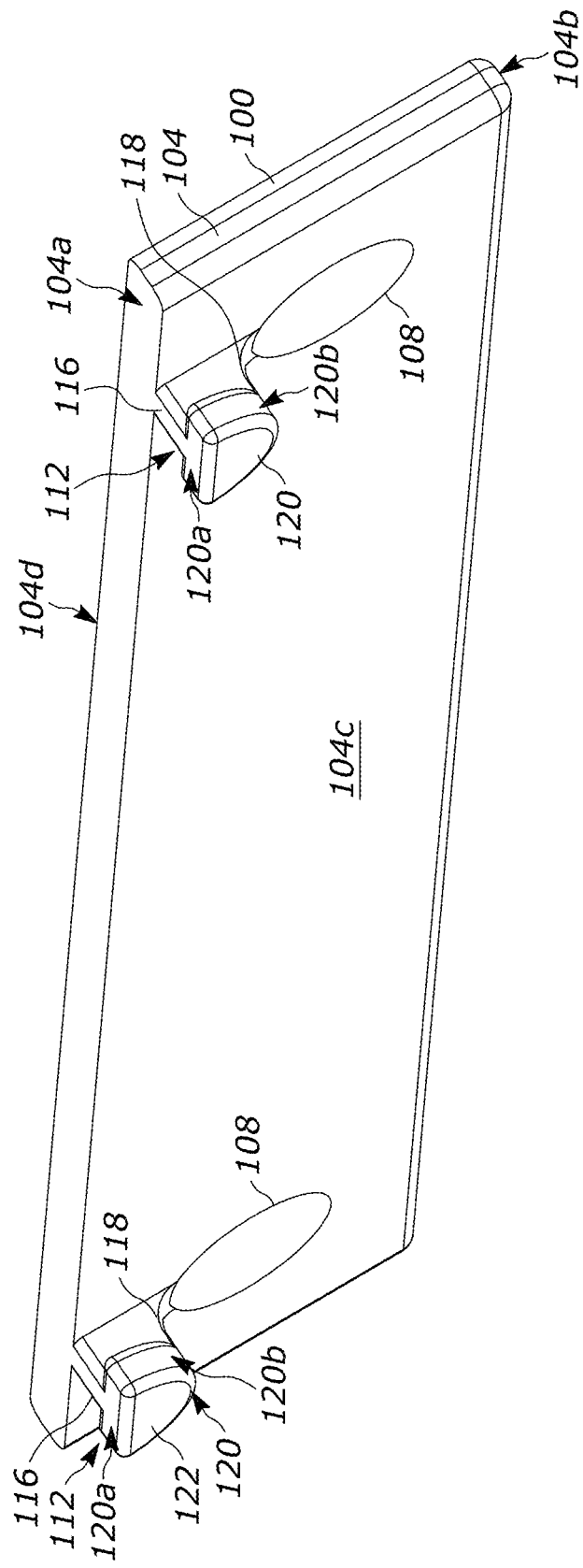
FIG. 2 is a second perspective view of the example retention bracket of FIG. 1 in accordance with various examples.
Figure 3:
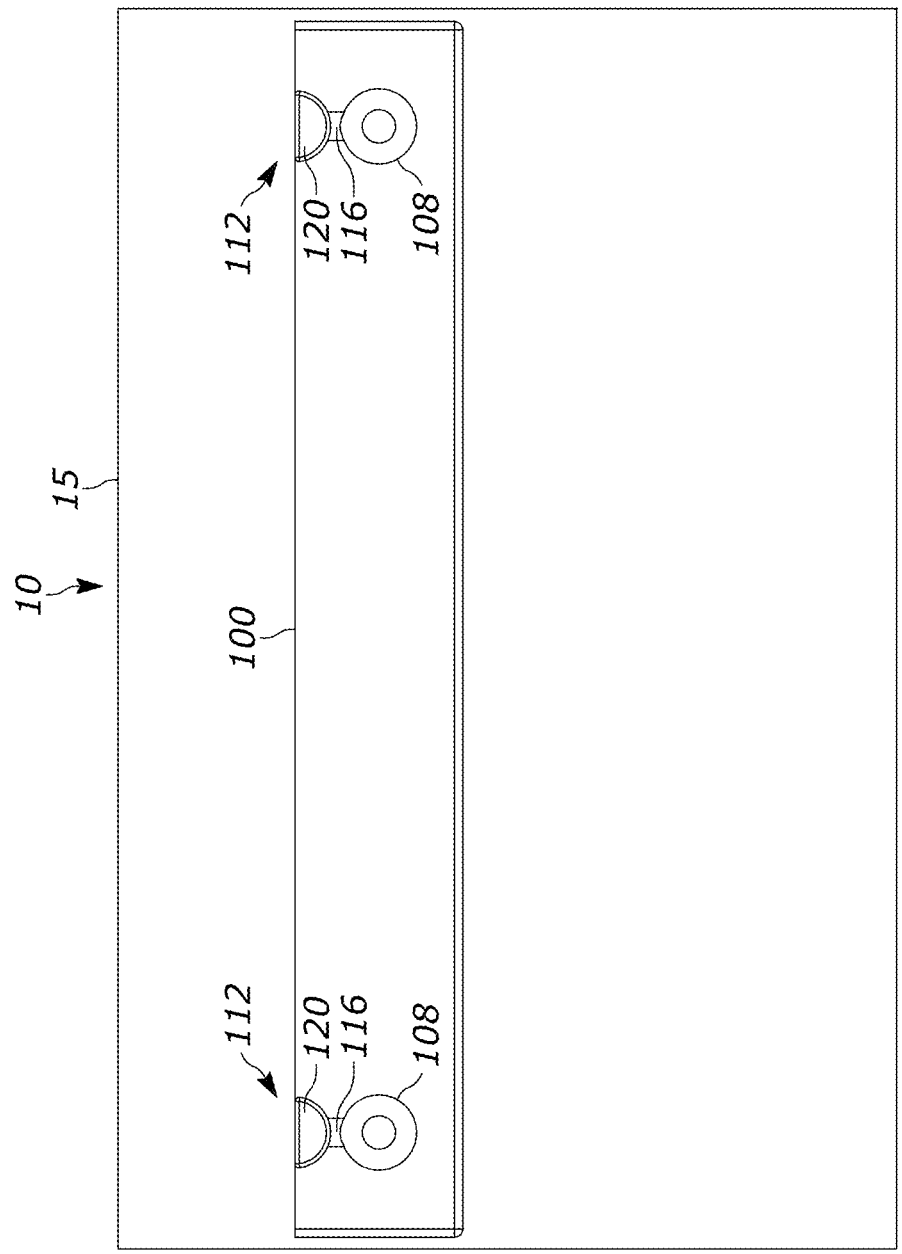
FIG. 3 is a front elevation view of the example retention bracket of FIGS. 1 & 2 coupled with an example structure in accordance with various examples.
Figure 4:
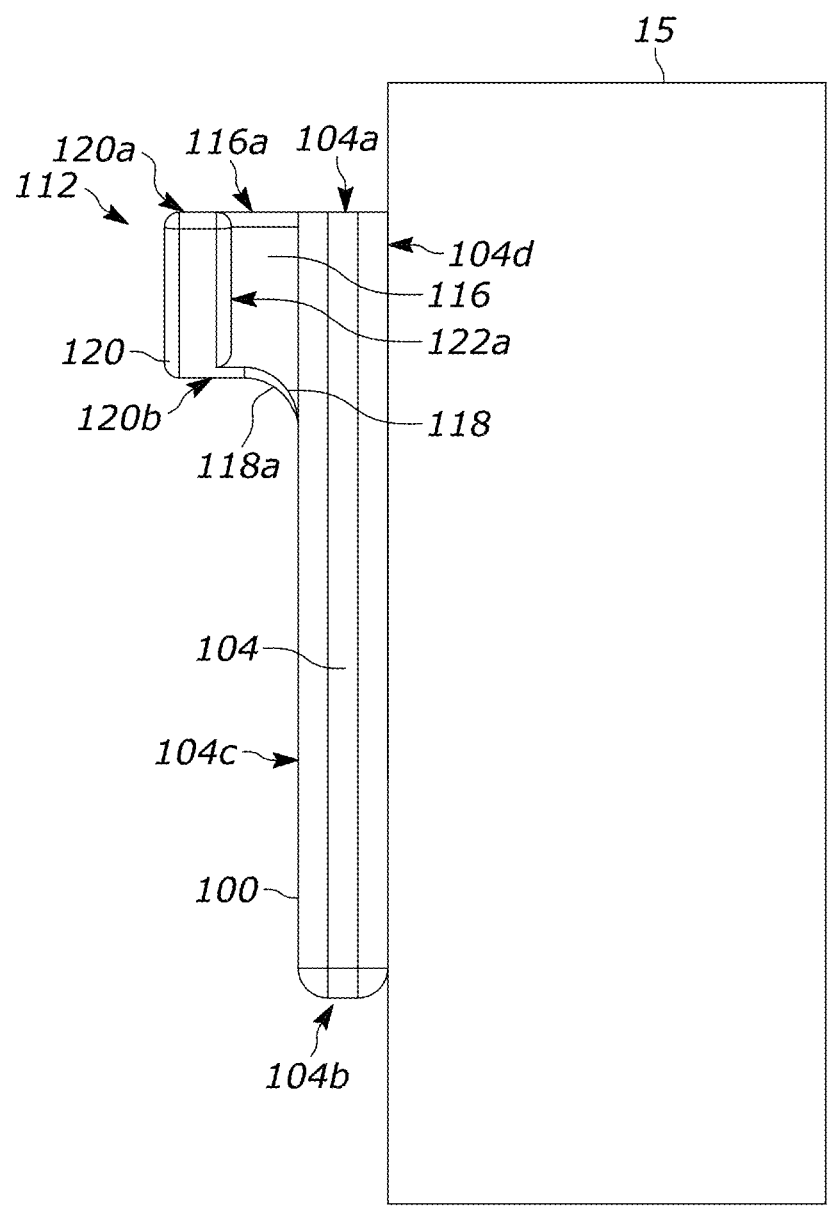
FIG. 4 is a side elevation view of the example retention bracket of FIGS. 1-3 coupled with an example structure in accordance with various examples.
Figure 5:
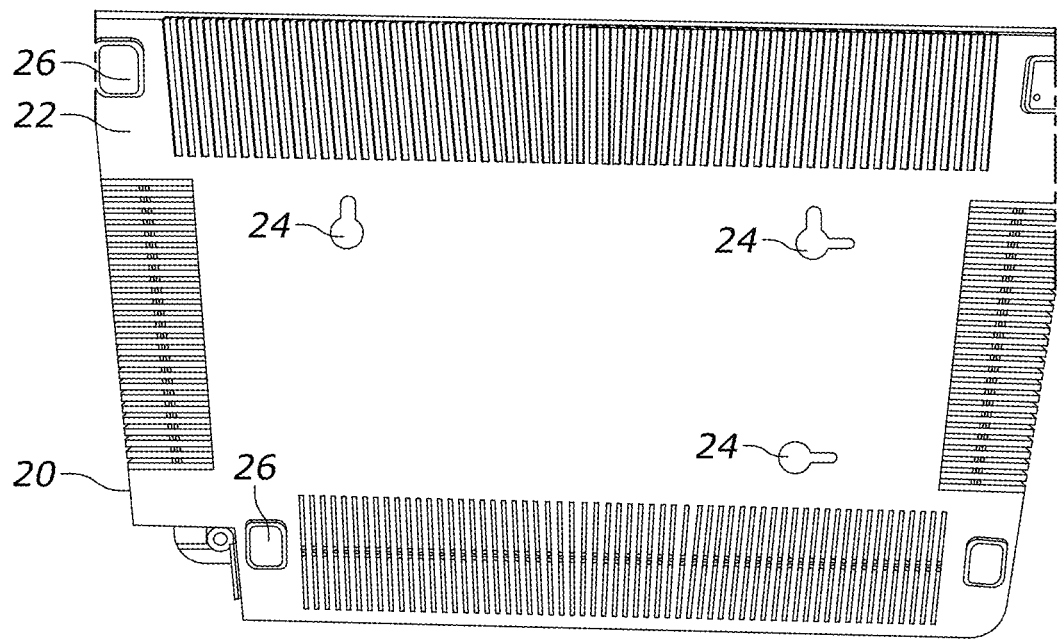
FIG. 5 is a perspective view of an example optical networking component to be retained by the example retention bracket of FIGS. 1-4 in accordance with various examples.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for securing and retaining components of passive optical networks (PONs). Generally speaking, a component of a PON, as utilized herein, may be in the form of a last mile termination unit (e.g., an optical network terminal (ONT) or an optical network unit (ONU) disposed at customer premises). Such a component may be securely retained within an existing enclosure using a bracket or locking apparatus. More specifically, the brackets described herein may accommodate dimensionally larger networking components without the need for modifications to achieve a secure fit. Further, in some examples, the brackets described herein may eliminate the need for additional securing mechanisms.

Turning now to the Figures, an optical networking system 10 is provided for retaining at least one networking component 10 (e.g., an ONT, ONU, and/or any other device) with or to a structure 15 (e.g., a wall, a pole, and the like). The system 10 may include a retention bracket 100 that, in some examples, may be constructed from any number of suitable materials such as, for example, polymeric materials, metals, and the like. Other examples are possible.

Generally speaking, the retention bracket 100 includes a body 104 that may be removably or permanently affixed to the structure 15. The body 104 includes an upper end 104a, a lower end 104b, a front surface 104c, and a rear surface 104d. Additionally, the body 104 may include any number of structure mounting members 108 that may be used to secure the body 104 with the structure 15. In the illustrated examples, the structure mounting members 108 are in the form of countersunk throughbores, but it is to be appreciated that other approaches such as, for example, hooks or similar members may be used.

The retention bracket 100 further includes any number of retention protrusions 112. In the illustrated examples, two retention protrusions 112 are provided that are positioned at or near the upper end 104a of the body 104 and extend from the front surface 104c thereof. Each retention protrusion 112 may include an arm 116 and a lobe 120 extending therefrom.

The arm 116 is operably coupled with the upper end 104a of the body 104. In some examples, the arm 116 is integrally formed with the body 104, but in other examples, the arm 116 may be secured therewith via any number of suitable approaches such as, for example, adhesives, welds, threaded interfaces, and the like. The arm 116 includes an upper surface 116a and a support buttress 118 at a lower portion thereof that defines a ramp surface 118a. This support buttress 118 provides additional structural support when the networking component 10 is coupled with the retention bracket 100.

The lobe 120 is operably coupled with the arm 116. In some examples, the lobe 120 and the arm 116 are integrally formed, but in other arrangements, these components may be operably coupled together via any number of suitable approaches. The lobe 120 is defined by a generally planar upper surface 120a and a curved (e.g., semicircular) lower surface 120b. The lobe 120 includes two wings 122 that extend outwardly from the arm 116. Each of these wings 122 includes an interior surface 122a.

As illustrated in the Figures, in some arrangements, the upper surface 116a of the arm 116 is coplanar with the upper surface 120a of the lobe 120. Additionally, these components are also coplanar with the upper surface of the body 104. The coplanar arrangement provides a number of advantages. First, this configuration ensures a streamlined and uniform structure, reducing material stress concentrations that might occur with non-planar transitions. By aligning these surfaces, the design enhances structural integrity and load distribution across the bracket assembly, which can improve durability and resistance to deformation under applied forces. Additionally, the coplanar design simplifies manufacturing processes, such as machining or molding, by minimizing complex geometries, potentially lowering production costs and ensuring consistency in assembly. This arrangement may also facilitate easier integration with adjacent components that interface with the bracket's upper surface, optimizing the overall functionality of the system.

Further, the support buttress 118 of the arm 116 transitions to the structure mounting member 108. Such an arrangement provides additional stability when the retention bracket 100 is secured to the structure via a fastener, as the fastener may provide additional stability and minimize rotational loading on the retention bracket 100 when retaining the networking component 20.

The retention bracket 100 may be secured with the structure 15 by placing the rear surface 104d thereof against the structure 15 at the desired location and inserting fasteners through the structure mounting members 108. Advantageously, the process of mounting the retention bracket 100 to the structure 15 is relatively straightforward due to the body 104 acting as a built in template. Such an arrangement reduces overall installation times and the need for additional equipment.

Figure 6:
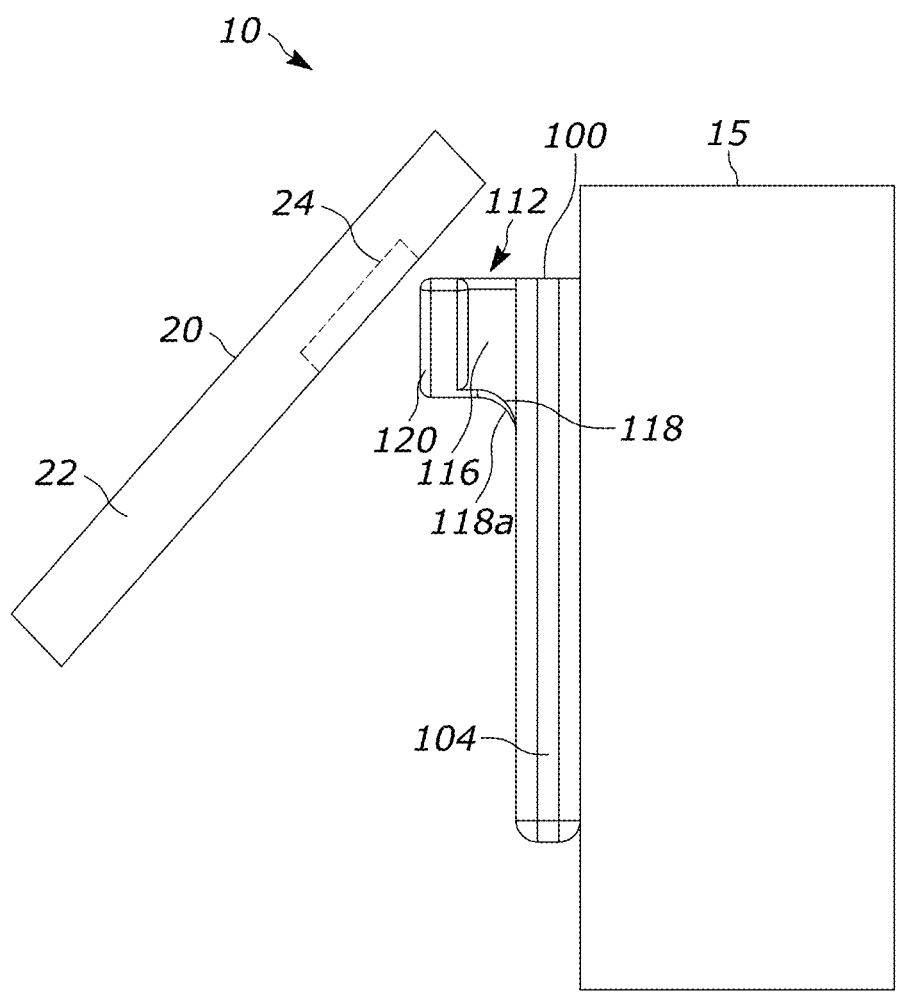
FIG. 6 is a side elevation view of the example optical networking component being coupled with the retention bracket of FIGS. 1-5 in accordance with various examples.
Figure 7:
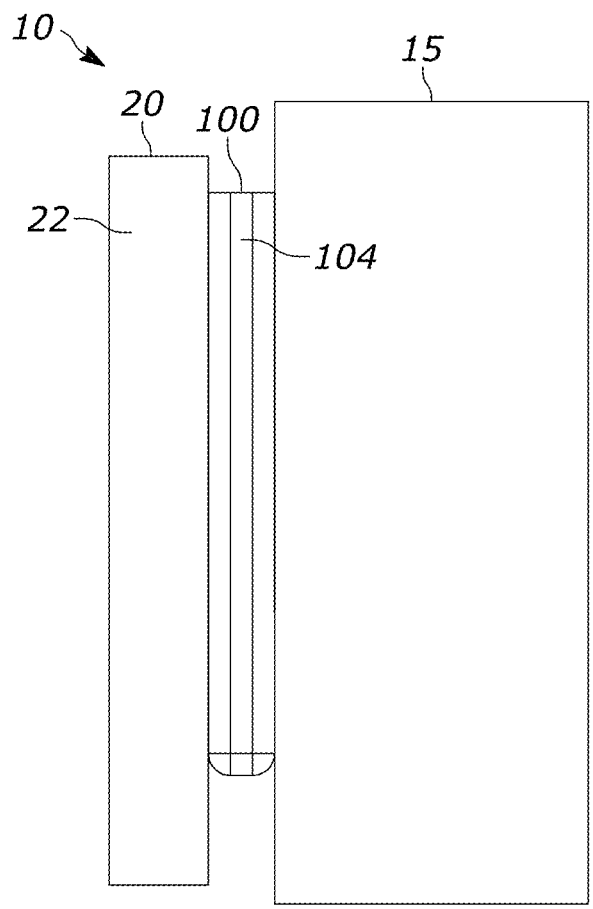
FIG. 7 is a side elevation view of the example optical networking component coupled with the retention bracket of FIGS. 1-6 in accordance with various examples.

The networking component 20 includes a housing 22 having any number of coupling features or keyhole openings 24 and feet 26. The lobe 120 may be of any suitable size and/or configuration to operably couple with the corresponding keyhole opening 24. More specifically, with reference to FIGS. 6 & 7, the lobe(s) 120 may be inserted into the corresponding keyhole opening 24 of the networking component 20 to secure the networking component 20 with the retention bracket 100 by first angling the networking component 20 relative to the retention bracket 100 and rotating the networking component 20 downwardly. As a result, a portion of the networking component 20 may rest against the front surface 104c of the body 104. An interior surface of the keyhole opening 24 may rest against the interior surface 122a of the wings 122 in the installed position to provide increased points of contact between the networking component 20 and the retention bracket 100.

In some arrangements, any number of the feet 26 may abut the front surface 104c of the body 104. In such arrangements, a gap may be formed between the housing 22 and the body 104 to provide for additional airflow and cooling.

When it is desired to remove the networking component 20 from the retention bracket 100, the networking component 20 may be raised such that a surface of the keyhole opening 24 engages the ramp surface 118a of the support buttress 118. The ramp surface 118a will assist with lifting the networking component 20 during the removal process. Additionally, because the upper surfaces 116a, 120a are generally planar, the networking component 20 may slide off the retention protrusion 112 as opposed to conventional approaches using a regular screwhead-type protrusion that require an additional lifting step.

It is to be appreciated that any number of modifications to the optical networking system 10 may be provided. For example, in some arrangements (not illustrated), the retention bracket 100 may couple with an enclosure that includes keyhole openings. Such an enclosure may retain the networking component 20 via any number of approaches such as, for example, a retention bracket 100 coupled therewith. Further, in some examples, a single retention bracket 100 may be provided that includes retention protrusions 112 dimensioned to be inserted through a keyhole opening of an enclosure in addition to a keyhole opening of the networking component 20. As a result the networking component 20 needn't be separately mounted to other otherwise secured with the enclosure.

So arranged, the retention bracket 100 may be used to safely retain larger networking components 20. Notably, the retention protrusions 112 are provided to allow for easy installation and removal of the networking component 20. The protrusions 112 advantageously provide for a clearance between the networking component 20 and the mounting surface of the structure 15 to allow the feet 26 of the networking component 20 to rest firmly thereagainst.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Numerous alternative examples could be implemented, using either current technology or technology developed after the filing date of this patent, which would still fall within the scope of the claims. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

By way of example, and not limitation, the disclosure herein contemplates at least the following examples:

A. A retention bracket is adapted to retain an optical networking component. The retention bracket comprises a body and defining at least one structure mounting member. The structure mounting member is adapted to secure the body to a portion of a structure. The retention bracket further includes at least one retention protrusion operably coupled with the body. The retention protrusion is adapted to releasably engage with an optical networking component, thereby securing the optical networking component to the portion of the structure.

B. The retention bracket of paragraph A, wherein the retention protrusion includes a lobe extending from an arm, wherein the arm is positioned at or near an upper end of the body.

C. The retention bracket of either paragraph A or B, wherein the lobe includes a generally planar upper surface coupled with a semi-circular lower surface.

D. The retention bracket of any of paragraphs A through C, wherein the generally planar upper surface of the lobe is coplanar to the upper end of the body.

E. The retention bracket of either paragraph A or B, wherein the arm comprises a support buttress.

F. The retention bracket of paragraph E, wherein the support buttress includes a ramp surface adapted to direct the optical networking component during coupling and decoupling from the retention bracket.

G. The retention bracket of paragraph A, further comprising a plurality of retention protrusions.

H. The retention bracket of paragraph A, wherein the at least one structure mounting member includes a throughbore adapted to receive a fastener.

I. An optical networking system comprises an optical networking component having a housing, the housing including at least one coupling feature, and further comprises a retention bracket including a body and defining at least one structure mounting member adapted to secure the body to a portion of a structure. The retention bracket further includes at least one retention protrusion operably coupled with the body. The coupling feature of the optical networking component is adapted to releasably engage with the retention protrusion, thereby securing the optical networking component to the portion of the structure.

J. The optical networking system of paragraph I, wherein the coupling feature of the optical networking component includes a recess adapted to engage the retention protrusion.

K. The optical networking system of paragraph I or J, wherein the optical networking component includes a mating surface portion, and wherein the retention protrusion includes a lobe, the mating surface portion adapted to contact or align with the lobe of the retention protrusion.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A retention bracket adapted to retain an optical networking component, the retention bracket including:
    a body and defining at least one structure mounting member adapted to secure the retention bracket with a portion of a structure; and
    a retention protrusion operably coupled with the body, the retention protrusion including a lobe extending from an arm, the arm including a support buttress having a ramp surface;
    wherein the retention protrusion is adapted to releasably engage with the optical networking component to secure the optical networking component to the portion of the structure, wherein the ramp surface of the support buttress is adapted to direct the optical networking component during decoupling and coupling.

2. The retention bracket of claim 1, wherein the arm is positioned at or near an upper end of the body.

3. The retention bracket of claim 2, wherein the lobe includes a generally planar upper surface coupled with a semi-circular lower surface.

4. The retention bracket of claim 3, wherein the generally planar upper surface of the lobe is coplanar to the upper end of the body.

5. The retention bracket of claim 1, further comprising a plurality of retention protrusions.

6. The retention bracket of claim 1, wherein the at least one structure mounting member includes a throughbore adapted to receive a fastener.

7. An optical networking system comprising:
    an optical networking component having a housing, the housing including at least one coupling feature; and
    a retention bracket including:
        a body defining at least one structure mounting member adapted to secure the body with a portion of a structure; and
        at least one retention protrusion operably coupled with the body, the at least one retention protrusion including a lobe extending from an arm, the arm including a support buttress having a ramp surface;
        wherein the at least one coupling feature of the optical networking component is adapted to releasably engage with the retention protrusion to secure the optical networking component to the portion of the structure, wherein the ramp surface of the support buttress is adapted to direct the optical networking component during decoupling and coupling.

8. The optical networking system of claim 7, wherein the coupling feature of the optical networking component includes a recess adapted to engage the retention protrusion.

9. The optical networking system of claim 7, wherein the optical networking component includes a mating surface portion and the retention protrusion includes a lobe, the mating surface portion adapted to contact or align with the lobe of the retention protrusion.

* * * * *